United States Patent [19]
Kreft

[11] Patent Number: 5,288,979
[45] Date of Patent: Feb. 22, 1994

[54] METHOD FOR ACTIVATING A DATA CARRIER HAVING AN INACTIVE CHIP BONDED TO THE DATA CARRIER FOR ACTIVATING THE DATA CARRIER

[75] Inventor: Hans-Diedrich Kreft, Dassendorf, Fed. Rep. of Germany

[73] Assignee: Angewandte Digital Elektronik GmbH, Fed. Rep. of Germany

[21] Appl. No.: 793,606

[22] Filed: Nov. 18, 1991

[30] Foreign Application Priority Data
Nov. 17, 1990 [DE] Fed. Rep. of Germany ....... 4036765

[51] Int. Cl.$^5$ .................. H04L 9/00; G06F 15/20
[52] U.S. Cl. ..................................... 235/380; 380/23
[58] Field of Search ................. 235/380, 382, 382.5; 380/23, 24, 25

[56] References Cited

U.S. PATENT DOCUMENTS

| | | | |
|---|---|---|---|
| 4,650,975 | 3/1987 | Kitchener | 380/24 X |
| 4,849,614 | 7/1989 | Watanabe et al. | 235/382 X |
| 4,885,788 | 12/1989 | Takaragi et al. | 380/23 |
| 5,036,461 | 7/1991 | Elliot et al. | 235/380 X |

Primary Examiner—David C. Nelms
Assistant Examiner—John R. Lee
Attorney, Agent, or Firm—Hill, Steadman & Simpson

[57] ABSTRACT

Electronic memory chips have been introduced into plastic cards, for example, credit, checking and/or personal data cards. A method for activating the memory chips makes it possible to issue the plastic cards for a specific use and to later expand the card use by activating the chip that had been inactive up to then and had no significance for the standard use of the cards. Protective measures are implemented in order to make use of the cards possible only for authorized persons. Cards issued or counterfeited by unauthorized persons may also be recognized and eliminated.

16 Claims, 1 Drawing Sheet

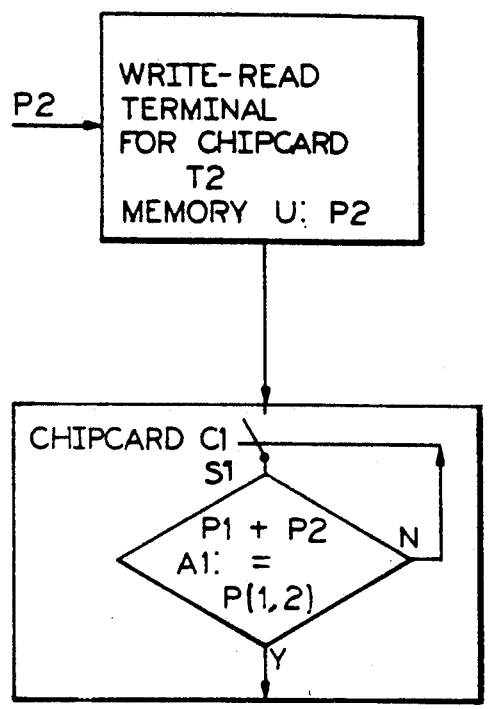
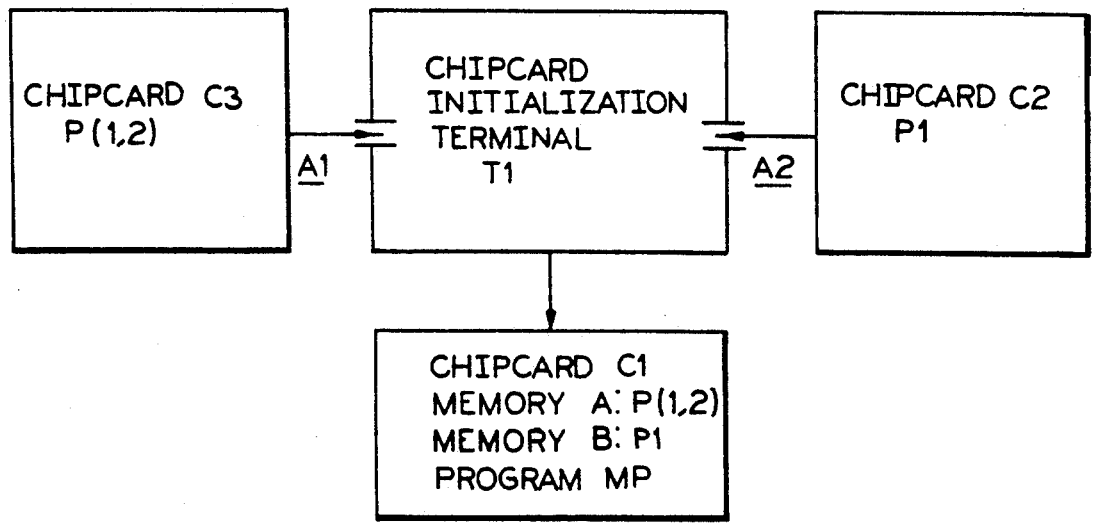

METHOD FOR ACTIVATING A DATA CARRIER HAVING AN INACTIVE CHIP BONDED TO THE DATA CARRIER FOR ACTIVATING THE DATA CARRIER

BACKGROUND OF THE INVENTION

Field of the Invention

The present invention generally relates to a contactless chip card interfaces which are used in plastic cards, frequently referred to as credit cards, checking cards, money cards or the like. The contactless interface is used within the plastic cards to perform computational and storage functions.

ISO Standards guarantee that geometrical dimensions of regions of the cards for applying information are clearly defined and limited from one another. The position of contacts on chip cards is also standardized. The positioning of these contacts generally deteriorates the usual application of information and the commercial design of the card. Previous standards have left the desires to standardize contactless card unaffected except to make the contactless cards fully compatible with existing, issued cards.

Currently chips are available which use contacts for their functioning. The contacts are embedded in traditional plastic cards, such as credit cards.

Plastic cards having a magnetic strip for data storage are the most widely used type. These magnetic strip cards often additionally contain a mechanical impression in their plastic part for storing data. Plastic cards without magnetic strips, but having mechanical impressions, are also utilized. Impressed data and data on the magnetic strip can be easily detected and duplicated by unauthorized persons. Often, security codes are stored on the magnetic strip which can, likewise, be duplicated by unauthorized persons.

SUMMARY OF THE INVENTION

The present invention allows data to be stored long-term and to be modified using a read-write station or terminal. Account statements, personal data, such as a personal identification number or security code, blood type, etc. may be stored on the contactless chip card. Any of this data may be erased or modified as needed. In addition, greater protection of the data against use and manipulation by other parties is available since data access is protected by a secret number that lies in the memory and cannot be seen by looking at the card itself and cannot be revealed by sight inspection.

The contactless interface has energy made available to it by primary electronics. The energy is supplied with an oscillator via two primary coils using the transformer principle. Secondary coils are used to energize standard integrated circuits as supplied by the contactless interface. The integrated circuits, particularly memory modules, may then carry out their specified function.

The contactless interface carries out load changes at one or both secondary coils dependent on the memory contents documented as changes in impedance in the primary electronics at the primary side. Data transmission from the contactless interface to the primary electronics in the form of an amplitude modulation is supplied. The contactless interface detects a phase shift between the two oscillations that are generated in the primary electronics and are coupled into the contactless interface via the coils. This results in a data transmission from the primary electronics to the contactless interface in the form of a phase modulation.

It is, therefore, an object of the invention to provide chip cards so as to make detection and duplication by unauthorized persons more difficult, if not impossible.

A further object of the invention is to design chip cards to be compatible with plastic cards so as to technologically supplement the plastic cards.

BRIEF DESCRIPTION OF THE DRAWINGS

FIG. 1 is a diagram of an implementation of a prime number factor test as used to activate chip cards.

FIG. 2 is a diagram of an initialization of a chip card.

DESCRIPTION OF THE PREFERRED EMBODIMENT

Traditional plastic cards predominantly serve as data carriers for identification of a card user. The ISO regulates the design of such traditional cards. A chip card is like the traditional plastic card in appearance, however, an inactive chip is bonded into the plastic material of the card and is invisible to the card user. Therefore, no visible contact areas in the plastic card are required, yet transmission of data and signals may be achieved. The chip is activated to make the card available for use.

A microprogram contained within the chip is introduced into the chip in a technologically standard chip manufacturing process. Activation occurs in two stages.

A first activation, independent of the readiness of an energy supply, does not lead to the transmission of a sequence for reporting the readiness of the chip. An unauthorized user cannot, therefore, recognize by sight inspection or visual examination the readiness of the chip from the outside. In the first activation level, a reception channel is opened in the chip with an appertaining port using a switch S1 as shown in FIG. 1. The action of opening the reception channel for exclusive data reception of the first activation level cannot be recognized from outside the chip since a transmission of data from the chip to an external receiver is suppressed. The switch S1 requires that a second activation level of the chip dominates over the first activation level with respect to the position of the switch S1. The reception channel with an appertaining port opened by the first activation level may be automatically and dominantly closed with the switch S1 by the second activation level.

The closing occurs as a result of first key data arriving via the channel. If this first key data does not agree with the immanent data present in the microprogram, the closing of the reception channel ensues. In addition, the second activation level opens the bidirectional data exchange as well as further channels.

When the immanent data contains calendar data, the switch S1 opens or closes channels dependent on given data. Activatable cards are only activated or deactivated at defined times determined by the calendar.

It is possible for an unauthorized user to identify the immanent data in the card by interrogation of the data transmitted to the card. This may be overcome by utilizing specific properties of prime numbers. Multiplication of two known, prime numbers may be formed in a short computing time. The reverse operation, resolving a number into its two prime factors, requires significantly longer calculating times. The following equation explains the relationship to be discussed:

$$P(1, 2) = P1 * P2$$

P(1, 2) represents a large number acquired by multiplying two prime numbers, P1 and P2. When two known prime numbers are multiplied to form a third number, the resolution of this third number into its unknown prime factors P1, P2 is significantly more time-consuming than its multiplicative operation even using high-performance computers and mathematically known algorithms. When, for example, the product of a medium-size prime number P1 and a second, comparatively medium-size prime number P2 results in an order of magnitude of about 200 bits of memory location, a computational calculation of the two unknown factors is not established in an economical time span.

When the number P(1, 2) is not the product of two prime numbers, then more than two factors of the number P(1, 2) exist since the factors themselves are in turn multiplicatively composed of prime numbers and more than exclusively one resolution into two prime factors may be derived. However, only two prime factors with respect to the specific numbers P(1, 2) exist.

FIG. 1 shows how the prime number factor test (P-test) is implemented in chip cards given use in a write-read terminal T2 for chip cards. The prime number P2 is input into the terminal T2 by a chip card input or in some other known way. The prime number P2 is the supplementary prime number factor that multiplicatively forms P(1, 2) with the other prime number P1. P2 is read into the chip card C1, and the card multiplies P1 by P2. The result is checked for agreement with P(1, 2). If the check has a negative outcome, i.e. the multiplication does not yield P(1, 2), then the card automatically inhibits the connection to the terminal P2 via the switch S1.

The check of immanent data is composed of two numbers, P(1, 2) and P1, preferably in binary form. These two numbers are in two different memories of the card chip. This is shown in FIG. 1 in the part referenced C1. The key number P2 does not lie in the memory of the chip, as may be seen from FIG. 1. Activation of the chip by opening S1 succeeds when the multiplication of P1 by P2 supplies the result P(1, 2). Inactivation of the chip only succeeds insofar as an external user knows the prime number P2. Only when suitable P(1, 2) and P1 are loaded as immanent data that match with prime numbers as key data do chip cards activate. Knowledge of the number P2 does not lead to the unauthorized duplication of chips having the same immanent data.

Despite these safeguards, chip cards do come into circulation that contain no immanent data and that simulate the execution of the above, but do not implement these events on the card, rather only simulate the implementation. The immanent data in the chip may additionally contain a test code that, upon input of an arbitrary, given test number, replies with the output of a numeral combination, a test reply. A test reply device is a combination of immanent data and the test number in accord with the test code prescription. The output of the test reply assures that these card chips must have immanent data stored thereon or that the test reply is generated on the basis of a random generator.

Chip cards fashioned in this way differ from cards that only simulate the implementation of an activation. Given knowledge of the immanent data, the test code, the test number and the test reply, it is possible to identify exactly those chips that do not have any correct, i.e. valid, immanent data in the chip. Therefore, chips that work by simulation may be recognized. Further, immanent data in chips can be tested without revealing the data since it is not the immanent data but an operation that is output.

When, for example, chip cards are to be tested at terminals, an arbitrary test number placed at the discretion of the respective user is input into the terminal. Given an inadequate input, i.e. an inadequate numerical sequence, the microprogram can request the input of further numerals until an adequately great number is achieved. The result, the test reply, can be transmitted together with the test number numeral sequence to a central location wherein the valid immanent data and test codes (for example, a multiplication algorithm) are known. The immanent data of the chip remain unrecognizable in this transmission due to the results of prime number encodings. Using the test reply, the central location may identify whether the deciphered immanent data matches the output, authorized data. The chip cards placed in circulation by unauthorized persons, therefore, may be identified at any arbitrary terminal. When the terminal is directly connected on-line to central data, the test ensues immediately. Otherwise, the data is printed out of the terminal and sent to the central location. The transmission is not critical with respect to deciphering. For example, hotels, vacation clubs, etc. can then have the cards checked, and counterfeit cards are filtered out.

It is not always necessary to send data to the central location in order to check the correctness of the immanent data and programs. With its test reply, the card serves as a comparison and reference card for the test of other cards. Since the test number that is input is random, the test reply for this random test number cannot be predicted. Given test numbers and immanent data selected which is adequately large, the protection of the immanent data is also guaranteed since a calculation of the immanent data on the basis of test queries cannot exist in economically justifiable time spans. When the test reply is stored in the terminal, the terminal automatically interrogates the test reply from other cards with the same test number. Given comparison to the stored test reply, non-agreement of the test replies indicate deviations of the immanent data. This is particularly useful in locations where on-site testing is adequate. This also requires that the test replies be known in the terminal.

The terminal, however, could be remodelled such that the coincidence of test replies is also generated by simulation thus making the test invalid. It is assumed, however, that the terminal is functioning faultlessly. Given cards that work contact-free, the possibility derives of placing two cards immediately on top of one another and of introducing them into the same physical environment of a write-read terminal. The activation of both cards may be guaranteed based on the identical physical-technological environment. The physical superposition of the test replies given non-equality of the data of the test replies is a feature of non-agreement of the immanent data in the chip. It is, therefore, not necessary to read the test reply out. The physical nature of the test reply is a feature coincident between two cards.

Furthermore, prime numbers are especially suited for coding purposes. In addition, arbitrary numbers of adequate magnitude, likewise, represent security for encodings. For this reason, all immanent data may be formed by arbitrarily large numbers. Such large numbers will be particularly suitable for encoding purposes, since they cannot be generated according to a calculating method that represents a frequent repetition of numbers or numeral sequences.

It is also possible to make memory location on the chip card selectively accessible to specific users or user clubs for the memory. These users are distinguished by the knowledge or use of an identical key that allows them to use exactly that memory location on the chip card assigned to them. Commercial organizations can, therefore, open up access to specific memory locations in the chip card. The selective access to the memory area where the immanent data lies is identified based on a user number as shorthand for identification of the user. Before the memory location following this shorthand is written or read, a test must be implemented.

Cards that enable a memory utilization by simulation are, therefore, excluded. Memory location may be used on the card for specific purposes, therefore, attaching great significance to commercial organizations, service providers, hospitals, etc. to initialize themselves with their specific data on the card. Furthermore, access to other memory locations is simultaneously possible for other users. When cards are placed in circulation that implement access to a club memory location without a security check, the memory can then be modified or read in an unauthorized way.

FIG. 2 shows an initialization of the chip card C1. An initialization refers to a first-time loading of the chip card chip with immanent data. For chip card initialization T1, the two chip cards C2, C3 that are already initialized are introduced into the terminal in separate receptacles A1, A2 and remain there during the initialization of the chip card. After plug-in of a first chip card C2, the prime factor P1 together with the number P(1, 2) of a second chip card C3 multiplicatively forms when the two numbers P1, P2 is forwarded by the terminals T1 onto the chip card C1 and is automatically stored by C1 in the memory A and in the memory B. The memories are preferably executed as EEPROM memories and therefore have the binary codings of P1 and P(1, 2) available to them over a long term without an additional energy source. The microcode in the chip in the card C1 prohibits read-out of the memories A and B. For the memories A, B, the code contains only write instructions and no read instructions.

Additional loading of immanent data is required for initialization, i.e. before the first-time loading of immanent data for using club memory location. As shown in FIG. 2, the numbers P1, P(1, 2) are contained as immanent data on two separate chip cards C2, C3 and the above-described security features will consequently be valid for these data. Both chip cards are introduced into a terminal T1 with the plug-in devices A1, A2, while P1, P(1, 2) remain invisible to the operator. The terminal automatically implements the initialization of the chip card C1. In addition to its immanent data whose memory location likewise remains unknown to the operator, the chip card C1 has further immanent data loaded into the additional memories A, B. The loading and the memory organization ensues internally in the card with the assistance of the microprogram MP.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for activating a data carrier having an electronic, inactive chip with a memory storing a microprogram wherein the chip leaves an intended and standard use and function of a traditional data carrier uninfluenced, comprising the steps of:

providing energy to an inactive chip by placing said chip in a first activation level wherein said chip has contacts to be enabled by activating an internal reset circuit which subsequently enables a clock on said chip, said clock is acquired on said chip by electronic circuitry, said first activation level also opening a reception channel on said chip having appertaining ports for exclusive data reception;

providing a second activation level of the chip which dominates the first level in that the reception channel with appertaining ports opened by the first level closes automatically insofar as first data arriving via the channel does not coincide with second data permanently stored in the microprogram;

holding the channel open for further data reception when the first data and the second data agree;

opening said channel for data output and optionally opening other channels in which the second data represents information of a datum and switching open the channel when a specific datum is reached; and closing the channel when said datum is reached thereby activating or deactivating said data carrier dependent on said datum.

2. The method according to claim 1 further comprising the steps of:

comparing said second data with said first data by implementing a prime number factor test wherein said second data are composed of two numbers which lie in two different memories or microprogram areas of said data carrier and wherein the first number is the product of the second number which is a first prime number and a key number which is a second prime number, wherein said key number contains the first data and is not contained in the memory of the chip; and activating the chip by opening a switch only when multiplication of the second number by the key number automatically implemented by the microprogram supplies the first number.

3. The method according to claim 2 wherein said two numbers are in binary form.

4. The method according to claim 2 wherein said second number and said key number are both greater than $10^{30}$.

5. The method according to claim 2 wherein said data carrier having second data additionally contains a test code in said chip that given a test number replies with a test reply;

wherein said test reply derives a combination between said second data and said test number upon application of said test code in said chip wherein all of said chips reacting with a test reply must have second data stored and differing from chips such that no second data are present and which implement an activation in only simulative fashion; and wherein an activation may be implemented after input of said key data without comparison of said key data and said second data whereby said test reply has a data combination in its numeral sequence that derives from said test code and said second data, so that during the check and given knowledge of the freely selected test number, knowledge of the test reply and knowledge of the second data, data carriers may be identified whose test reply deviates from possible data combinations of correct test replies and consequently, must contain different second data in their chip other than said known second data.

6. The method according to claim 3 further comprising the steps of:
 causing a first data carrier in a terminal to output a test reply by inputting a test number;
 storing said test reply in said terminal for comparison during a time span until interrogation of the next test reply;
 causing arbitrary, further data carriers to automatically output their test reply after the same test number is input; and
 comparing coincidence of test replies to determine if further data carriers contain the same second data and programs as said first data carrier.

7. The method according to claim 6 further comprising the steps of:
 placing a second data carrier directly onto said first data carrier so as to cover said first data carrier;
 testing said second data of said first data carrier by introducing a write/read unit which supplies said first data carrier and said second data carrier with energy thereby activating both said first data carrier and said second data carrier; and
 supplying a test number to both said first data carrier and said second data carrier from said write/read unit such that said first data carrier and said second data carrier reply to said test number.

8. The method according to claim 7 wherein said reply is an ordered superposition of physical transmission conditions.

9. The method according to claim 8 wherein one of said physical transmission conditions is electromagnetic oscillations of said test replies.

10. The method according to claim 7 further comprising the steps of:
 generating said physical transmission conditions when said conditions are generated by said second data and said microprogram in both said first data carrier and said second data carrier; and
 generating undecipherable signals when said conditions transmitted from said second data and said microprogram are not identical in both said first data carrier and said second data carrier.

11. The method according to claim 2 wherein said second data may be arbitrary numbers suitable for encoding purposes based on their selection or based on a computational method used to generate said numbers.

12. The method according to claim 11 further comprising the step of:
 loading additional second data into said chip to open and to close defined areas of the memory in said chip with a switch in a same way as provided for activation of said overall chip, such that said defined areas of memory are made available to all users that are addressed by all subscribers that have a matching data key so as to form a closed user club.

13. The method according to claim 12 further comprising the steps of:
 marking at least one of said defined areas of memory with an identifier so that access of said at least one of said defined areas may be quickly achieved; and
 beginning said testing after said at least one defined area of a particular user club has been identified thereby protecting access to said at least one of said defined areas.

14. The method according to claim 12 further comprising the steps of:
 storing both said first number and said second number on two separate data carriers as second data;
 introducing both of said data carriers into two plug-in devices in a terminal; and
 initializing a third data carrier at said terminal such that said third data carrier, in addition to its own second data, loads additional second data into its memory using its microprogram.

15. The method according to claim 1 wherein said clock is acquired on said chip by transmission via contacts.

16. The method according to claim 1 wherein said clock is acquired on said chip by supplying a transmission frequency.

* * * * *